United States Patent [19]

Remy

[11] Patent Number: 4,815,374
[45] Date of Patent: Mar. 28, 1989

[54] COMPUTER PERIPHERAL FOR THE TREATMENT OF DATA PROCESSING DOCUMENTS

[76] Inventor: Hubert Remy, "Les Sorbiers" 88700, Rambervillers, France

[21] Appl. No.: 887,511

[22] Filed: Jul. 21, 1986

[30] Foreign Application Priority Data

Jul. 23, 1985 [FR] France .................. 85 11357

[51] Int. Cl.⁴ .................. B65H 41/00
[52] U.S. Cl. .................. 101/426; 101/2; 101/226; 270/21.1; 209/900
[58] Field of Search .................. 101/226–227, 101/233, 2, DIG. 19, DIG. 25, 426; 270/20.1, 21.1, 52.5; 209/900, 919, 701, 538, 552, 583, 657

[56] References Cited

U.S. PATENT DOCUMENTS

| | | | |
|---|---|---|---|
| 3,222,964 | 12/1965 | Obenshain | 270/21.1 X |
| 3,700,908 | 10/1972 | Devaney, Jr. | 101/226 X |
| 3,749,239 | 7/1973 | Holdway et al. | 209/900 X |
| 3,890,893 | 6/1975 | Kodis | 101/227 X |
| 3,968,350 | 7/1976 | Watson | 283/73 X |
| 4,177,730 | 12/1979 | Schriber et al. | 101/226 |
| 4,488,610 | 12/1984 | Yankloski | 101/2 |
| 4,535,892 | 8/1985 | Roes et al. | 101/2 X |
| 4,593,893 | 6/1986 | Suter | 101/226 |

FOREIGN PATENT DOCUMENTS

| | | |
|---|---|---|
| 0118730 | 9/1984 | European Pat. Off. |
| 2723573 | 11/1978 | Fed. Rep. of Germany .......... 101/2 |
| 2921816 | 12/1979 | Fed. Rep. of Germany ...... 101/226 |
| 3032517 | 4/1982 | Fed. Rep. of Germany . |
| 2256100 | 7/1975 | France . |
| 2315131 | 1/1977 | France . |
| 2556654 | 6/1985 | France . |

Primary Examiner—E. H. Eickholt
Attorney, Agent, or Firm—Sandler & Greenblum

[57] ABSTRACT

A computer peripheral apparatus is provided which includes a printer which is connected to a computer which supplies data to be printed. The printer is fed with paper that is moved continuously by a sprocket drive and becomes printed sheets as it passes beneath a printer head of the printer. Each printed sheet moves alongside optical cells that read symbols that appear on lateral strips of paper connected by perforations about either side of the main printed sheet, which is then passed to a cropping device for cutting off the lateral strips, and then moves to a reading table which is followed by a succession of elements for routing of the printed sheets, either through a gate and into an appropriate bin, or onto a station for turning the printed sheet in a predetermined direction according to information read by the optical reading cells before its output from the apparatus.

11 Claims, 3 Drawing Sheets

1

COMPUTER PERIPHERAL FOR THE TREATMENT OF DATA PROCESSING DOCUMENTS

TECHNICAL FIELD OF THE INVENTION

This invention relates to a computer peripheral apparatus for the treatment of data processing documents.

DISCUSSION OF RELEVANT INFORMATION

In the present state of the art, computers are frequently connected to printers to which they supply data to be printed on a listing. The data to be printed can vary considerably in its nature and its addressees, and it is often necessary to repeatedly cut the listing coming out of the printer in order to separate the different printed pages and sort them.

To facilitate these operations, the listing in most cases has a central sheet bordered by two strips at the sheet edges, which can be separated from the central sheet by tearing along a pre-existing line of perforations, and transverse perforations which help the folding of the documents and the separating of them from one another.

However, there are several remaining disadvantages with computer output peripheral equipment as they are known in the present state of the art. Primarily, they do not permit a rapid and reliable sorting of documents emerging from the printer, and in most cases they require the presence of a person responsible for these operations to monitor them, and this increases working costs.

Consequently, one of the aims of this invention is to provide a computer peripheral apparatus which is capable of automatically conducting all of the necessary operations from the printing of the information supplied by the computer onwards, i.e., a peripheral apparatus which will carry out printing of the documents, separate their edge strips, sort them automatically and route them towards other devices which are known, such as units for finishing or folding the documents.

Another aim of this invention is to present a computer peripheral apparatus whose operation and possibilities for document routing are far superior to those of designs known in the present state of the art, while at the same time permitting operation with high output at low cost.

Another aim of the computer peripheral apparatus according to the present invention is to permit the connection, directly after the output of the peripheral apparatus, of a standard device for finishing the documents and putting the documents into envelopes, regardless of the direction from which the documents arrive.

BRIEF DESCRIPTION OF THE DRAWINGS

Other aims and advantages of this invention will appear in the following description which is given as an example and which is not limiting, and by reference to the drawings wherein.

DETAILED DESCRIPTION OF THE DRAWINGS

Figure 1:
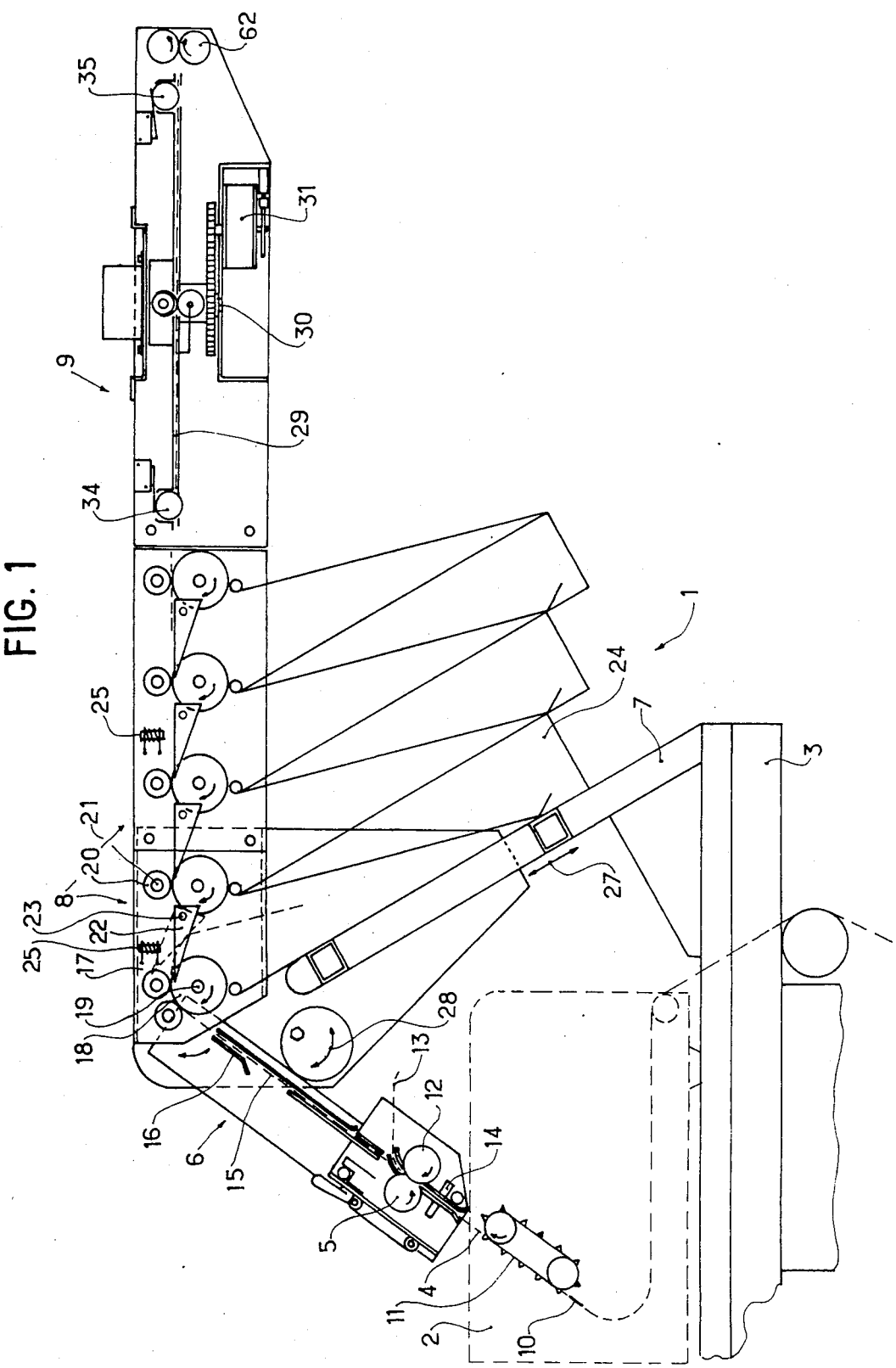
FIG. 1 is a view, in elevation and in section, of a mode of construction of the computer peripheral apparatus according to the invention.

With reference to FIG. 1, the computer peripheral 1 according to the invention is principally comprises a printer 2 set up on a support or a table 3 and followed, at the level of the output of printed paper 4, by a cropping device 5 which is connected to a reading table 6 supported by a mounting 7, this reading table 6 itself being followed by a succession of sorting elements 8, then by a station 9 for turning and/or switching the documents.

Naturally, printer 2, and in particular its printing head and sprocket drive 11, can be enveloped within a known type of sound-proofing cover.

Since the printed document 4 consists of a central strip with two lateral strips provided with a succession of holes to be engaged by the sprockets of the sprocket drive 11, the cropping device 5 consists preferably of a type of cropper as described in French Pat. No. 2,556,654. This cropping device 5 is thus equipped with rotating knives 12 for cutting, and then separating, lateral strips 13 from the central strip of document 4.

The computer peripheral apparatus according to the invention is also provided with optical reading cells 14 for reading the graphic symbols printed by the computer on the lateral strips 13, in order to permit subsequent switching of the different documents to their respective stations for treatment. As lateral strips 13 are separated from the central strip of document 4 by cropping device 5, the optical reading cells 14 are placed directly between the exit of printer 2 and the input of cropping device 5.

At the exit of cropping device 5, the printed paper 4 is presented in the form of a central printed strip with perforated lateral strips 13 removed. Consequently, since cropping device 5 is provided, according to the above-referenced patent, with means for cutting paper 4 transversely, this paper is presented on the reading table 6 in the form of a succession of printed sheets 15. Reading table 6 preferably comprises a deflector 16 allowing the different sheets or piles of sheets 15 to be switched towards the sorting elements 8.

Reading table 6 is followed by one or more sorting elements 8 to which it supplied sheets 15 as they arrive.

Sorting elements 8 consist of a chassis 17 on which cylindrical rollers 18 are mounted; rollers 18 move around a horizontal axis 19 and are driven by motors (not shown). These drive rollers 18 cooperate with guide rollers 20 which are tangential to drive rollers 18 and which rotate freely about axis 21. In this way, sheets 15 arriving at the level of the sorting elements 8 are driven by rollers 18 with which they are kept in contact by means of guide rollers 20.

In order for sorting elements 8 to fulfill their function, they are fitted with guides 22 placed between two successive drive rollers 18 and movable around an axis of rotation 23. Sorting elements 8 are also provided with a certain number of pigeonholes 24 which can receive sorted sheets 15, with each of these pigeonholes 24 containing the sheets 15 that are intended for the same address or use.

During the operation of the computer peripheral according to the invention, guides 22, rotating around their axis 23, can be placed into a raised or lowered position. Thus, when a guide 22 is in a raised position, it functions as a guiding element for switching sheet 15 to a corresponding pigeonhole 24. On the other hand, when guide 22 is in a lowered position, it functions as a support for sheet 15, which is advanced by drive roller 18, and allows it to reach the next drive roller 18 of sorting element 8.

Naturally, for sorting element 8 to be able to work, it must be provided with controls which can activate guides 22 in accordance with the destination of the arriving sheet 15. For this purpose, sorting elements 8 are fitted with control mechanisms consisting, for example, of electromagnets 25 acting on guides 22, which in this case are metallic, thus bringing them into the lowered or raised position.

It is obvious, however, that guides 22 must be raised or lowered selectively at predetermined instants according to the destination of sheet 15 which has to be directed either towards one of the pigeonholes 24, or towards station 9 for turning and/or switching.

According to the invention, the sequencing of these operations is obtained via optical reading cells 14 of a known type, which read a code printed by computer on the lateral strips 13 before they are detached from printer paper 4. This makes it necessary for the output of optical reading cells 14 to be connected to the input of an electronic interface (not shown) to which are transmitted the codes printed on lateral strips 13. The output of electronic interface 26 is connected to electromagnets 25 which the electromagnetic interface controls so that guides 22 can be activated according to a sequence corresponding to the codes read off of lateral strips 13.

Naturally, according to the number of sorting possibilities which the computer peripheral apparatus according to the invention must possess, the succession of sorting elements 8, driver rollers 18 and pigeonholes 24 can be controlled in their entirety, all these elements being movable so that they can be added or removed to suit the case. Furthermore, mounting 7 of the computer peripheral apparatus according to the invention has adjustments for height 27 and for inclination 28 to permit the best adjustment of the space occupied by the computer peripheral apparatus to suit the needs of the user.

According to the invention, computer peripheral apparatus 1 has, after the one or more sorting elements 8, a station 9 for turning and/or switching sheets 15 which were not previously shunted towards one of the movable pigeonholes 24.

Figure 2:
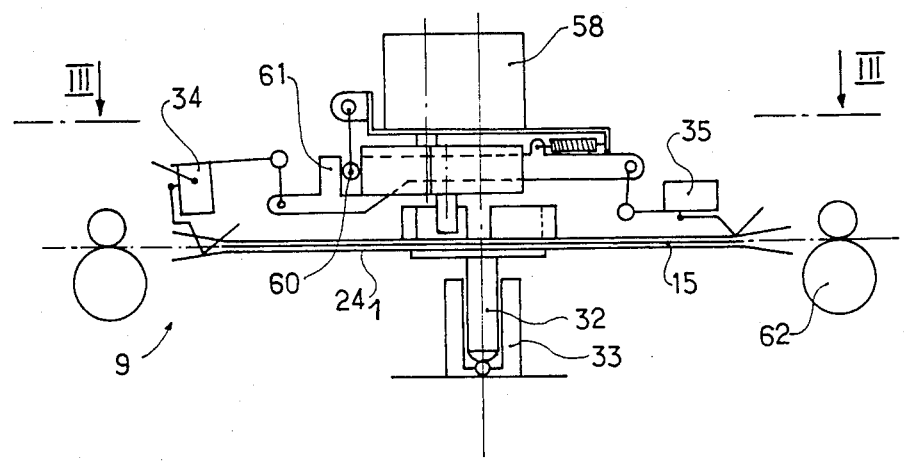
FIG. 2 is a view, in elevation and in section, of 9 station for turning the sheets in the peripheral apparatus according to the invention.
Figure 3:
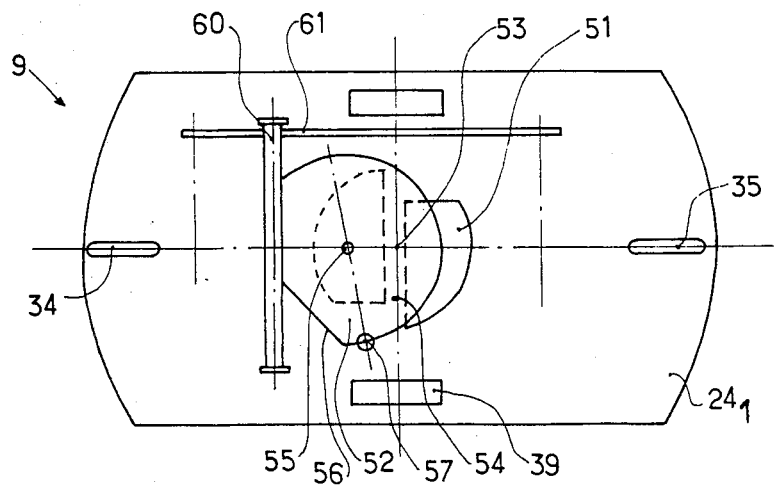
FIG. 3 is a plan view according to a section III—III of the device of FIG. 2.
Figure 4:
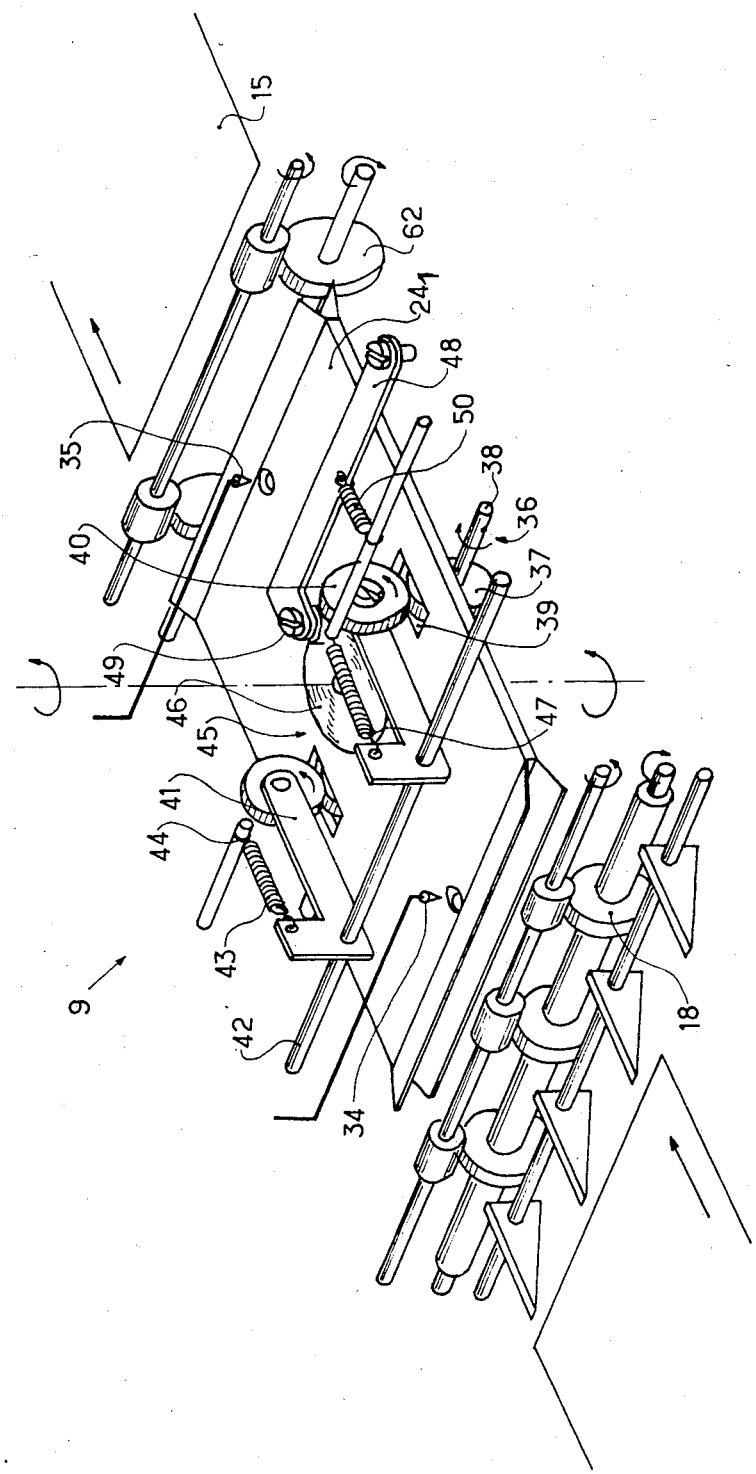
FIG. 4 is a view in perspective of another mode of construction of a station for turning the sheets of the computer peripheral apparatus according to the invention.

We now refer to FIGS. 2, 3 and 4. Station 9, for turning and/or switching, consists mainly of a more or less rectangular container $24_1$ into which is fitted the sheet 15 to be turned. This container $24_1$ is then turned by 180°, or is displaced by another predetermined angle around a vertical axis by motors 31 which are also controlled by electronic interface 26.

So that container $24_1$ with sheet 15 or a pile of sheets can turn by fractions of turns, it comprises one piece, with vertical mobile axis 32 rotating within a bearing 33 (FIG. 2). It is necessary for sheet 15 to be entirely positioned within container $24_1$ when the container rotates. For this purpose, container $24_1$ is provided with an entry presence detector 34 and an exit presence detector 35. These detectors 34 and 35 can be of any suitable type, including electromechanical detectors (FIG. 2) or optical detectors (FIG. 4).

Station 9 for turning and/or switching is also provided with means 36 (FIG. 4) for advancing sheets 15, so that they can be moved into container $24_1$ when they are out of reach of the drive rollers 18 (FIGS. 1 and 4) of sorting elements 8 situated before the turning station 9. According to a preferential varient of the invention, means 36 for advancing sheets 15 consist of drive rollers 37 in one piece with a drive shaft 38 and cooperating, through longitudinal slits 39 cut in the container $24_1$, with idling rollers 40. The latter must be able to be folded back so that they do not hamper the movement of the sheets 15 when they are being turned (FIG. 4).

Idling rollers 40 rotate in relation to supporting arms 41 in one piece with an axis 42. Thus, to fold idling rollers 40 upwards when container $24_1$ rotates, it is sufficient to cause the corresponding rotation of axis 42 by an appropriate means, which causes support arms 41, to which idling rollers 40 are attached, to be automatically brought upwards. Idling rollers 40 are returned back to the lowered position when container $24_1$ stops rotating by return springs 43 attached, on the one hand, to support arms 41 and, on the other hand, to any point 44 that is in one piece with the support of the machine.

According to the invention, the angular adjustment of container $24_1$ can be made in various ways. According to one mode of construction, in the simplest case, where station 9 is used only for turning sheets 15 through 180°, the angular adjustment can be easily achieved, as illustrated in FIG. 4, by a cam 45 with a profile allowing the container $24_1$ to be positioned in successive equilibrium positions corresponding to rotations of 180°. To accomplish this, the cam 45 consists of a serrated cam 46 having on its periphery two notches 47 situated at an angular interval of 180° and cooperating with arm 48 provided with roller 49 which, engaging successively in one of notches 47 under the action of spring 50, defines the equilibrium positions of container $24_1$.

In this operation of turning station 9, drive motors 31 (not visible in FIG. 4) work only intermittently, and their direction of rotation is reversible according to the direction taken by sheet 15 after turning, and consists of a motor reducer controlled by electronic interface 26, which causes the rotation of notched cam 46 in one piece with container $24_1$.

According to another mode of construction, the angular setting of container $24_1$ is fixed by two cams 51 and 52 (FIGS. 2 and 3). Cam 51, in one piece with container $24_1$, moves around vertical axis 53 and its profile contains a groove 54. Cam 52 moves around vertical axis 55 and is provided on its periphery with flat surface 56 and roller 57. During the movement of cam 52 driven by motor reducer 58, roller 57 penetrates into groove 54 of lower cam 51. This results in the rotation of cam 51 and of container $24_1$ which is in one piece with it. At the end of each turn of container $24_1$ corresponding to a rotation of 180°, roller 57 leaves slit 54 of cam 51, and this corresponds to one of the two equilibrium positions of container $24_1$.

It should be noted that if presence detectors 34 and 35 are of the electromechanical type, as illustrated in FIGS. 2 and 3, it is necessary to raise these detectors to allow the passage of the sheet when it enters or leaves container $24_1$. For this purpose, turning station 9 is fitted with bar 60, cooperating with flats 56 of cam 52 (FIG. 2). Bar 60 activates lever 61, acting on microswitches or presence detectors 34 and 35, to raise or lower them according to the position at the moment of cam 52. Moreover, presence detectors or microswitches 34 and 35 are connected to the control circuits of the different motor drives which provide the rotation of container 24₁, axis 38 carrying rollers 37, and exit rollers 62 (FIG. 4). Of course, the most suitable cam profile for cams 51 and 52 (FIG. 3) is easily determined by a skilled technician so as to ensure the correct sequencing of the switching on of the motor drives (not shown) by presence detectors 34 and 35.

Therefore, during the operation of turning station 9 according to the invention, the detection of sheet 15 by presence detector 34 (FIGS. 2, 4) switches on the motor driving rollers 37 (FIG. 4) so that sheet 15 can be positioned completely within container 24₁. When sheet 15 arrives at the level of presence detector 35, drive rollers 37 are stopped, and the motor reducer rotating container 24₁ is started up to obtain the turning of sheet 15. At the end of this turning, exit detector 35 is raised by means of cam 52 (FIG. 3), bar 60 and lever 61 (FIG. 2), which correspond to the restarting of the motor activating drive rollers 37 and the activating of exit rollers 62 (FIG. 4), thereby allowing sheet 15 to be advanced out of container 24₁ for use. Then, as the rotation of cam 52 continues, lever 60 is positioned in the hollows of the cam, thus making presence detectors 34 and 35 return to their initial position, and stopping motor reducer 58 from driving cam 52 until a new turning cycle starts.

It should be noted that the motor driving axis 38 (FIG. 4) is, with respect to turning station 9, a bidirectional motor and that at each half turn of container 24₁, the direction of rotation of this motor has to be reversed; and this is done by a simple reverser controlled by container 24₁.

Of course, the embodiment described applies to a 180° rotation of container 24₁ as applies in part of a turning station 9, as shown in FIGS. 2, 3 and 4.

According to another embodiment of the invention, the computer peripheral apparatus 1 can comprise a switching station replacing the simple turning station 9, and permitting angular displacements of container 24₁ according to angular values determined by electronic interface 26, in accordance with the graphic symbols read off transverse strips 13 of sheets 15 by optical reading cells 14, as described above. For this purpose, switching station 9 must be provided with motor drives controlled by electronic interface 26, and preferably consisting of a step-by-step motor comprising means for rotating container 24₁ according to specific desired angular values.

This type of extrapolation of turning station 9, in turning through angles other than 180°, permits positioning, at the exit of computer peripheral apparatus 1, of several devices for further processing of sheets 15, such as lines for finishing, for folding, or for putting sheets 15 into envelopes. These different types of devices are supplied one after another according to the graphic data symbols of a sheet 15 and are handled in computer peripheral apparatus 1.

Of course, to avoid jamming of sheets in computer peripheral apparatus 1, it is advisable to activate guide rollers 18 (FIG. 1) at a higher speed than the maximum speed at which sheets 15 can come out of printer 2. Moreover, so that each sheet 15 can be switched correctly into the pigeonholes and/or into the switching or turning station 9, it may prove necessary to introduce a timing system to take account of the time taken by sheets 15 to move between the reading of the graphic data symbols by optical reading cells 14, and their arrival at the level of the pigeonholes and/or the turning and/or switching station 9.

The computer peripheral apparatus 1 described above thus presents several working possibilities since it is designed as a combination of several modular elements. It permits complete automation of the "paper circuit" between leaving the computer printer and arriving selectively at predetermined locations based upon data read off the paper sheets. This mode of sorting, or envelope filling offers a considerable advantage over other known methods for processing of computer printed paper output because of the fact that it is piloted by the computer's graphic symbols printed on lateral strips of paper 15, in cooperation with electronic innerface 26, and this permits very complex sequences. Thus, as a non-limitative example, the computer peripheral apparatus is particularly suitable for bank account statements where each addressee can have one or more documents put into an envelope.

Although the invention has been described according to one particular varient, it is, of course, by no means limited to this, and various modifications may be made to shapes, dimensions or combinations of these elements without departing from the context and the spirit of the invention.

I claim:
1. A method for sorting a plurality of documents, said method comprising:
   (a) feeding a plurality of printed sheets of paper having first and second sides into a printer, each sheet having a first lateral strip on said first side and a second lateral strip on said second side;
   (b) printing graphic and numeric symbols with said printer on said first and second lateral strips of each of said printed sheets of paper;
   (c) reading said symbols on said lateral strips with a plurality of optical reading cells, and supplying signals from said optical reading cells to an electronic interface for controlling a paper sheet sorting apparatus in accordance with the symbols read;
   (d) cutting said first and second lateral strips from each of said sheets of paper;
   (e) conducting said sheets of paper, without said lateral strips, to a sorting apparatus;
   (f) sorting said printed sheets, using said sorting apparatus, in response to said signals from said electronic interface;
   (g) conducting any printed sheets which have not been placed by said sorting apparatus into a bin of said sorting apparatus to a turning station; and
   (h) rotating said printed sheets, at said turning station, over a predetermined angle of rotation.

2. A computer peripheral apparatus for the treatment of data processing documents, said apparatus comprising:
   (a) a printer having a printer head and means for feeding the printer with printed sheets of paper, said feeding means comprising a sprocket drive;
   (b) a plurality of optical reading cells comprising means for reading graphic and numeric symbols printed by said printer on lateral strip portions of said printed sheets of paper, said optical reading cells further comprising means for supplying signals to an electronic interface which is adapted to control a sorting apparatus for sorting a plurality of said printed sheets of paper after they are separated from said lateral strips which have graphic and numeric symbols thereon;

(c) a cropping device comprising means for cutting said lateral strips from said sheets;

(d) a sorting apparatus including a plurality of sorting elements controlled by said electronic interface, said sorting elements comprising means for selectively sorting said printed sheets of paper;

(e) a reading area for permitting visual inspection of said printed sheets, said reading area comprising means for conducting said printed sheets to said sorting apparatus; and (f) a station for turning said printed sheets over a predetermined angle.

3. Apparatus in accordance with claim 2, said sorting apparatus including at least one bin for receiving printed sheets, a plurality of adjacent guide rollers, and a plurality of guides, said optical reading cells being connected to said electronic interface, said electronic interface having an output which is connected to a mechanism for controlling said sorting elements, said electronic interface thereby comprising means for controlling operation of said sorting elements, said sorting elements comprising a plurality of electromagnets which comprise means for raising and lowering said plurality of guides, each of said guides lying substantially in the same plane and being positioned between adjacent ones of said guide rollers, wherein movement of each of said guides selectively opens one said bin for receiving a printed sheet.

4. Apparatus in accordance with claim 3, wherein said sorting apparatus further comprises a plurality of drive rollers for driving said paper sheets along said plane, said drive rollers being adapted to cooperate with said guide rollers, wherein adjacent drive rollers are spaced from each other by a distance substantially equal to the length of one of said guides which is controlled by said electromagnets.

5. Apparatus in accordance with claim 2, wherein said turning station comprises a platform which is rotatable about a vertical axis, said turning station further comprising a motor and a motor-driven first cam controlled by said electronic interface in accordance with symbols read by said optical cells, said cam comprising means for rotating said platform about a desired angle of rotation.

6. Apparatus in accordance with claim 5 wherein said turning station comprises a plurality of drive rollers for conducting said printed sheets onto and away from said platform, said turning station having an entrance and an exit, said turning station further comprising means for detecting the presence of said paper sheets at said entrance and at said exit of said turning station, said paper presence detecting means comprising means for controlling said turning station drive rollers.

7. Apparatus in accordance with claim 6, wherein said paper presence detecting means comprises an electromechanical presence detector and said turning station comprises a plurality of idling rollers and said idler for maintaining said paper sheets on said platform when said paper sheets are positioned on said platform.

8. Apparatus in accordance with claim 6, wherein said cam has a periphery, said cam periphery including two notches which are spaced apart by 180°, said turning station further comprising a spring biased arm, a base and a locking roller, said spring biased arm being attached to said base of said station at one end and attached at a second end of said arm to said locking roller, wherein said locking roller is adapted to engage each of said notches of said cam.

9. Apparatus in accordance with claim 6, further comprising a second cam in addition to said first cam, wherein said first cam has at least one flat surface and a roller attached to said cam, said at least one flat surface comprising means for moving said detecting means, said second cam having a groove which is adapted to selectively cooperate with said first cam roller.

10. Apparatus in accordance with claim 2, wherein said motor is a step motor comprising means for rotating said platform at an angle established by said electronic interface in response to signals received from said optical reading cells after said optical reading cells have read symbols on said lateral strips of said printed sheets.

11. Apparatus in accordance with claim 6, where said paper presence detecting means comprises an optical detector.

* * * * *